United States Patent [19]

Fulger et al.

[11] Patent Number: 4,508,745
[45] Date of Patent: Apr. 2, 1985

[54] PRODUCTION OF A MANNAN OLIGOMER HYDROLYSATE

[75] Inventors: Charles V. Fulger, Millwood; Howard D. Stahl, Scarsdale, both of N.Y.; Evan J. Turek, Paramus, N.J.; Renee Bayha, Mahopac, N.Y.

[73] Assignee: General Foods Corporation, White Plains, N.Y.

[21] Appl. No.: 454,914

[22] Filed: Dec. 30, 1982

[51] Int. Cl.$^3$ ................................. A23F 5/24
[52] U.S. Cl. ...................... 426/594; 127/36; 127/37; 426/432; 426/434
[58] Field of Search .................. 426/594, 432, 434; 127/36, 37

[56] References Cited

U.S. PATENT DOCUMENTS

| | | | |
|---|---|---|---|
| 2,573,406 | 10/1951 | Clough et al. | 426/594 |
| 2,687,355 | 8/1954 | Benner et al. | 426/594 |
| 3,224,879 | 12/1965 | DiNardo | 426/594 |

OTHER PUBLICATIONS

Sivetz et al., Coffee Technology, 1979, Avi: Westport, Conn., pp. 348–354.

*Primary Examiner*—Joseph Golian
*Attorney, Agent, or Firm*—Thomas A. Marcoux; Richard L. Crisona; Thomas R. Savoie

[57] ABSTRACT

A method of hydrolyzing a coffee extraction residue material to produce a mannan oligomer solution having oligomers from DP 1 to DP 10 is disclosed. The coffee material, preferably spent grounds from a commercial percolation system, is hydrolyzed in a reactor in the presence of an acid catalyst. A tubular plug flow reactor is convenient, although any reactor providing for the relatively high temperature, short time reaction will suffice. Particular acid catalysts include sulphuric acid, phosphoric acid, acetic acid and carbon dioxide gas. Depending on the specific time, temperature and catalyst concentration selected, a mannan oligomer solution having any desired distribution of oligomers between DP 1 and DP 10 is produced.

14 Claims, No Drawings

PRODUCTION OF A MANNAN OLIGOMER HYDROLYSATE

TECHNICAL FIELD

The present invention relates to a method of hydrolyzing a coffee extraction residue material. More particularly, the invention involves hydrolyzing a coffee extraction residue material, such as the spent grounds from a commercial coffee percolation system, in a reactor in the presence of an acid catalyst. A tubular plug flow reactor is convenient, although any reactor providing for the relatively high temperature, short time reaction will suffice. The hydrolysate so produced is a mannan oligomer mixture having oligomers ranging from DP 1 to DP 10. The specific conditions selected for the reactor determine the distribution of the mannan oligomers between DP 1 and about DP 10. The mannan oligomer hydrolysate is useful for increasing the soluble coffee solids content in combination with an aqueous extract of roasted coffee, for example.

BACKGROUND ART

Hydrolyzing coffee material, particularly partially extracted coffee grounds, to obtain an increased solids yield is well known in the art. For example, U.S. Pat. No. 2,573,406 to Clough et al. discloses a process for producing a soluble coffee which involves atmospherically extracting about 20% of the weight of the coffee, hydrolyzing a portion of the grounds in a suspension of about 1% sulphuric acid at 100° C. for about one hour, adjusting the pH of the hydrolysate, filtering the hydrolysate, combining the same with the atmospheric extract and drying the combined extract. In another, similar process described in U.S. Pat. No. 2,687,355 to Benner et al., phosphoric acid is used in place of sulphuric acid. In still another process, disclosed in U.S. Pat. No. 3,224,879 to DiNardo et al., either alkaline or acid hydrolysis is carried out directly in the extraction train on coffee grounds that have been at least atmospherically extracted. Hydrolysis directly in the extraction train eliminates the separate hydrolysis step of the prior art processes and provides for adsorption of the alkaline or acid catalyst in the mass of spent coffee grounds.

As to the Clough et al. and Benner et al. processes, the batch hydrolysis reactions at relatively low temperatures require about one hour to complete, limiting the practicality of said processes on a commercial scale. Moreover, both Clough et al. and Benner et al. essentially aim for whatever hydrolysate results from operating at 100° C. for one hour. Neither disclosure describes a method for nor the desirability of manipulating the hydrolysis conditions so as to affect the composition of the resulting hydrolysate. A similar deficiency is noted with respect to the DiNardo disclosure.

It is also widely recognized in the art that cellulosic material containing predominantly carbohydrate polymers and lignins may be hydrolyzed with an acid catalyst under short time high temperature conditions. However, if the cellulosic material is not relatively pure the hydrolysis reaction will produce undesirable by-products. For that reason, the art dealing with acid hydrolysis of primarily cellulosic material is generally limited to the hydrolysis of waste paper and paper by-products or agricultural wastes such as corn hulls, husks or cobs. For example, U.S. Pat. No. 4,201,596 to Church et al. discloses a continuous process for the saccharification of cellulosic materials in a tubular reactor with an acid catalyst. The object of the Church et al. process is the conversion to glucose, furfural and xylose of cellulosic waste materials such as saw dust, wood waste, corncobs, etc. Along the same lines, the kinetics of the conversion of cellulosic wastes to monosaccharides in a plug flow reactor are described in Thompson, David R. and Grethlein, James E. "Design and Evaluation of a Plug Flow Reactor for Acid Hydrolysis of Cellulose." Ind. Eng. Chem. Prod. Res. Dev., Vol. 18, No. 3, pp 166-169 (1979). The authors of said article are specifically interested in hydrolyzing cellulose-rich material to monosaccharides. The authors do not disclose a method of hydrolyzing only to oligomers, much less to a specific mix of oligomers. Another disclosure, U.S. Pat. No. 4,316,747 to Rugg et al., describes a process for hydrolyzing cellulosic waste to glucose using an acid catalyst in a twin screw extruder.

Though the art discloses much about the short time, high temperature acid hydrolysis of cellulose-rich materials, the art does not disclose such treatment of materials in which cellulose is not a major component, such as a coffee extraction residue material, particularly the spent grounds from a commercial percolation system. The major hydrolyzable carbohydrate in coffee extraction residue material is mannan, not cellulose. Moreover, the products of mannan hydrolysis degrade under cellulose hydrolysis conditions, destroying any desirable mannan oligomer intermediates that are produced.

It is an object of the present invention to provide a method of hydrolyzing a coffee extraction residue material in which mannan is the major carbohydrate.

Another object of the invention is to provide a method of hydrolyzing a coffee extraction residue material to produce a mannan oligomer mixture having oligomers from DP 1 to about DP 10.

Still another object of the invention is to provide a method for producing a mannan oligomer mixture with the desired distribution of oligomers between DP 1 and about DP 10.

DISCLOSURE OF THE INVENTION

It has now been found that the objects of the invention are met by a method of hydrolyzing a coffee extraction residue material in a reactor in the presence of an acid catalyst. The coffee extraction residue material, preferably spent grounds from a commercial percolation system, is slurried in water and the pH adjusted to between pH 1 and 4 by the acid catalyst. The slurry is then fed through a reactor at a temperature between 160° C. and 260° C. in about 6 to 60 seconds. After discharge, the hydrolyzed coffee extraction residue material is separated from the mannan oligomer mixture having oligomers from DP 1 to about DP 10. The distribution of the mannan oligomers between DP 1 and DP 10 depends on the specific conditions selected for a given reactor. It is also possible to hydrolyze the mannan initially present in the coffee extract residue material completely to the monosaccharide mannose (hereinafter referred to as a mannan oligomer having DP 1).

The present invention takes advantage of several properties of the coffee extraction residue material not widely recognized in the art. First, most of the art dealing with coffee grounds focuses on the cellulosic content of said grounds, not emphasizing that there is actually more mannan than cellulose present in the grounds. Moreover, the inventors herein unexpectedly found that said mannan is substantially separately hydrolyzable from the cellulose. That is to say that the conditions under which mannan and cellulose in coffee material hydrolyze are sufficiently separated so that an essentially pure mannan hydrolysate is produced. Finally, it has been found that the mannan need not be hydrolyzed completely to a monosaccharide as is the object of most cellulose hydrolysis work (although it is possible to do so), but the mannan may be hydrolyzed to produce a mannan oligomer solution having any desired distribution of oligomers between DP 1 and about DP 10.

Before proceeding to a detailed description of the invention, it is necessary to define some relevant terms:

"Mannan" as used herein refers broadly to any polysaccharide consisting of d-mannose units. The monosaccharide d-mannose is an aldohexose and an isomer of d-glucose, differing only by having the opposite spatial arrangement of the hydroxyl group nearest the carbonyl. The mannan found in the coffee extraction residue material may have up to 40 d-mannose units in the polysaccharide.

Similarly, "cellulose" refers broadly to the polymer consisting of cellobiose units which, in turn, may be hydrolyzed to two glucose units. Thus, cellulose yields the monosaccharide glucose upon complete hydrolysis. Cellulose makes up much of the structural material of plants. A more complete discussion of cellulose and its properties is found in Conant, J. and Blatt, A. *The Chemistry of Organic Compounds.* N.Y., Macmillan, 1947. pp. 295-299.

"Oligomer" is intended to mean a polymer comprised of a relatively few number of monosaccharide units. Specifically, as used herein, oligomer refers to polymers consisting of less than 10 monosaccharide units. Mannose is referred to as an oligomer of DP 1 for convenience, although strictly speaking, an oligomer is typically comprised of more than one constituent unit.

"Degree of polymerization" or "DP" refers to the number of monosaccharide units that make up a given oligomer. Thus, a mannan oligomer of DP 4, for example, consists of 4 mannose units.

"Coffee extraction residue material" is intended to mean a roast and ground coffee material that has been partly extracted, preferably at least atmospherically extracted. Coffee that has been partly thermally hydrolyzed in order to hydrolyze the less stable polysaccharides such as arabinogalactan is particularly useful as coffee extraction residue material. The spent grounds from a commercial percolation system is an example of coffee that has been atmospherically extracted and partly thermally hydrolyzed.

In a commercial coffee percolation system, roast and ground coffee is extracted in a multisection, countercurrent extraction battery in which fresh water at a temperature in excess of about 175° C. enters the section containing the most spent coffee (the coffee that has undergone the greatest extraction). Concentrated coffee extract is withdrawn from the section containing the freshest coffee. Said coffee obviously undergoes a compositional change during percolation. Table 1 shows the approximate composition of roast and ground coffee whereas Table 2 shows the composition of spent grounds obtained from a commercial extraction system. While the overall percentage of carbohydrates remains approximately constant, the thermally hydrolyzed arabinogalactans are seen to be mostly removed. So, the preferred coffee extraction residue material is composed of about 45% by weight carbohydrates, of which over half is mannan.

TABLE 1

| Approximate Composition of Roasted Coffee | |
|---|---|
| Component | % By Weight (dry basis) |
| polymeric carbohydrates | 41 |
| arabinogalactan | 13 |
| mannan | 20 |
| cellulose | 8 |
| protein | 13 |
| caramel and browning products | 13 |
| lipids | 11 |
| inert material | 9 |
| acids | 6 |
| ash | 4 |
| caffeine | 2 |
| trigonelline | 1 |

TABLE 2

| Approximate Composition of Spent Grounds | |
|---|---|
| Component | % By Weight (dry basis) |
| polymeric carbohydrates | 45 |
| arabinogalactan | 5 |
| mannan | 25 |
| cellulose | 15 |
| lipids | 25 |
| inert material | 20 |
| protein | 10 |

As to the details of the instant method, the coffee extraction residue material is first slurried in a liquid, typically water, prior to being fed to a plug flow reactor. The slurry should be between 5% by weight and 20% by weight of the dry basis coffee extraction residue material in order to insure sufficient solids content in said reactor for efficient hydrolysis. Moreover, the slurry should be uniform, that is, the residue material should be distributed evenly throughout. If the slurry is made up in batch beforehand, steps should be taken to insure uniformity such as recirculation by means of a slurry pump. In the event a different reactor, such as an extruder, is used, it is not necessary to dilute the slurry as much. For example, spent grounds from a conventional percolation system typically containing between about 50% and 60% by weight liquid may be fed directly to such an extruder without further dilution.

An acid catalyst is then added to the slurry in order to adjust the pH to the suitable level. The acid catalyst is typically added at between about 0.05% by weight and 2.0% by weight of the slurry. It has been found that a slurry pH between 0.5 and 4 is desired to catalyze the short time, high temperature hydrolysis of mannan to mannan oligomers. The pH, in combination with a given reaction time and temperature determines the distribution of the different degrees of polymerization of mannan oligomers. A lower pH (combined with higher temperature and perhaps longer reaction time) tends to provide oligomers of lower degree of polymerization or, in the limiting case, the monosaccharide mannose. Conversely, a higher pH tends to favor mannan oligomers of higher DP.

Specific acid catalysts contemplated for use in the present invention include both inorganic acids and organic acids. A strong inorganic acid, such as sulphuric acid, is particularly suitable for use herein because of the relatively small amount of the acid needed to reach the desired pH. Sulphuric acid is easy to precipitate out from the final hydrolysate and the acid enjoys wide application in the food industry. Other inorganic acids, such as phosphoric acid, nitric acid, and hydrochloric acid are also suitable, as is a combination of acids, such as phosphoric acid combined with sulphuric acid. Organic acids alone or in combination, such as acetic acid, citric acid, tartaric acid, malic acid, adipic acid and fumaric acid, also make acceptable acid catalysts although generally being weaker, relatively greater amounts of organic acid are needed to achieve the desired pH adjustment.

After the acid catalyst has been added to the slurry, said slurry is fed to a reactor. Suitable continuous reactors include those capable of promoting relatively high temperature, short time reactions, such as single or double screw extruders or plug flow tubular reactors. A suitable batch reactor is a so-called explosion puffer wherein the coffee extraction residue material is mixed with the acid catalyst, placed in the reactor vessel which is then pressurized, as with steam. The pressure is suddenly and explosively released, discharging the contents from the reactor vessel. The mannan oligomer mixture having oligomers ranging from DP 1 to about DP 10 is then leached from the material so discharged from said reactor vessel. The plug flow tubular reactors are especially convenient. A plug flow tubular reactor is essentially a cylindrical length of pipe in which a reaction can take place. An orifice is placed on the discharge end of the reactor in order to control the pressure in the reactor as well as the rate of discharge from said reactor. "Plug flow" refers to the velocity profile of the slurry flowing through the reactor. Normally, a fluid exhibits a parabolic profile velocity wherein the fluid in the center of a conduit has a higher velocity than fluid flowing closer to the wall. In a plug flow reactor, the velocity profile is flat, arising from the geometry of the vessel and the nature of the fluid.

The elevated temperature is achieved in the reactor in any of several ways. For example, the slurry may be passed through a heat exchanger prior to entering said reactor. Temperature may then be maintained by simply insulating the reactor. Alternatively, high pressure steam may be injected directly into the reactor as a means of raising the temperature. Although the steam may dilute the slurry somewhat, such heating is extremely rapid, permitting short time reactions. Selection of the preferred heating method, as well as sizing of the diameter of the reactor and orifice are all within the skill of a worker in the art, based on standard design principles.

The conditions maintained within the reactor are, of course, critical in insuring that essentially only the mannan is hydrolyzed and that the desired distribution of mannan oligomers is achieved. It has been found that the reaction temperature should be between 160° C. and 260° C., preferably from 190° C. to 220° C., in order to hydrolyze the mannan and minimize the degradation of the mannan oligomers so produced. Such temperatures correspond generally to a pressure in said reactor between 6 atmospheres and 35 atmospheres, which is about the saturation pressure of the water in the slurry fed to the reactor. In general, a higher temperature promotes the production of mannan oligomers of a lower degree of polymerization (depending on the pH and the length of reaction) and the converse is also generally true. The preferred reaction time has been found to be between 6 seconds and 60 seconds. Below about 6 seconds, the equipment is limiting as it is very difficult to heat the slurry and insure uniformity of the reaction. On the other hand, if the reaction is carried on for much longer than about 60 seconds in the presence of the acid catalyst, the mannan oligomers (and the small amount of arabinose and galactose that may be present) begin to degrade, causing off flavors, limiting the useful yield and making purification of the hydrolysate difficult.

As hereinbefore noted, the discharge end of the reactor has an orifice thereon to control pressure within the reactor and control the rate of discharge. Passing the slurry through the orifice rapidly reduces the pressure to which the slurry is subjected to about atmospheric. Such a rapid reduction of pressure causes expansion and evaporative cooling of the slurry thereby "quenching" or immediately terminating the hydrolysis reaction. By so quenching the reaction, it is possible to control the reaction time to within the prescribed 6 seconds to 60 seconds with great reliability.

Once the slurry is discharged from the plug flow tubular reactor, said slurry is cooled further and may then be separated into the mannan oligomer solution and the remaining hydrolyzed coffee extraction residue material. It is also preferable to neutralize the discharged slurry by known techniques, such as precipitation of the acid with a salt, evaporation of a volatile acid or the use of an ion exchange resin. The neutralization may be either before or after the separation of the mannan oligomer solution and the hydrolyzed coffee extraction residue material. Separation may be by any method of solid-liquid separation known in the art. For example, said slurry may be filtered in order to remove the hydrolyzed coffee extraction material therefrom. Alternatively, the slurry may be separated by centrifuging the slurry, as in a basket centrifuge. After separation, the hydrolyzed coffee extraction residue is disposed of, most preferably burned for fuel.

An alternative embodiment of the present invention is one in which carbon dioxde gas is used as the acid catalyst. The carbon dioxide gas may be dissolved in the slurry prior to entering the reactor by pressurizing the slurry under a headspace of carbon dioxide gas while agitating said slurry. The slurry is then fed to the reactor as hereinbefore described. Alternatively, rather than add the catalyst to the slurry prior to entering the reactor as hereinbefore described, the carbon dioxide gas is injected directly into the plug flow tubular reactor wherein the carbon dioxide gas dissolves in the slurry, lowering the pH to less than about pH 4. The surprising aspect of using carbon dioxide gas is that injection of said gas is able to sufficiently alter the pH of the slurry so as to still catalyze the short time, high temperature hydrolysis reaction. The acid catalysts previously discussed are all relatively strong acids, certainly stronger than the acid resulting from dissolving carbon dioxide gas in the slurry. It was unexpectedly found that said acid, despite its relative weakness, is able to catalyze the hydrolysis of the mannan in the coffee extraction residue material.

Whichever embodiment is used, the instant method provides for production of a mannan oligomer solution having oligomers from DP 1 to about DP 10. Moreover, the specific conditions selected for the reactor determine the distribution of the mannan oligomers between DP 1 and about DP 10. The controlling principle is that "harsher" conditions, that is, higher temperatures, longer reaction times and lower slurry pH's, favor the production of oligomers with lower degrees of polymerization (with the limiting case being the production of the monosaccharide, mannose). Conversely, hydrolysis at temperatures towards the lower end of the range, for shorter periods of time and at higher slurry pH's favors a solution with a distribution of oligomers having higher degrees of polymerization. Table 3 shows the distribution of the mannan oligomers in hydrolysates produced at the different conditions listed. The reactor used was a plug flow tubular reactor with provision for direct steam injection. The acid catalyst in each case was sulphuric acid and the reaction time was about 6 seconds. The overall yield based on the starting weight of the coffee extraction residue material and the amount of oligomers produced was about 30%. The mannan oligomer distribution was determined by high performance liquid chromatography (HPLC) with the percentage indicated being the relative percentage of the total peak area for the mannan oligomers.

TABLE 3

| acid catalyst level % by weight | temp. °C. | Distribution of mannan oligomers (%) | | | | | | |
|---|---|---|---|---|---|---|---|---|
| | | DP1 | DP2 | DP3 | DP4 | DP5 | DP6 | DP7 |
| 0.25 | 240 | 98.6 | 1.4 | | | | | |
| 0.25 | 220 | 95.5 | 4.5 | | | | | |
| 0.10 | 220 | 34.0 | 25.9 | 19.0 | 11.0 | 6.5 | 2.7 | 0.9 |
| 0.10 | 240 | 47.1 | 27.6 | 14.7 | 6.6 | 2.6 | 1.1 | 0.3 |

As can be seen from Table 3, the higher acid catalyst concentration (and lower slurry pH) combined with the higher hydrolysis temperature favors oligomers with lower degrees of polymerization whereas oligomers from DP 1 to DP 7 are produced at lower acid catalyst concentration and the lower hydrolysis temperature.

The mannan oligomer mixture having oligomers ranging from DP 1 to about DP 10 produced by the method of the present invention has numerous applications and the specific distribution of oligomers in the mixture may be tailored to any given end use. One of the more important uses is the addition of said mixture to a conventional coffee extract in order to increase the amount of soluble coffee produced from the starting roasted and ground coffee. Inasmuch as the mannan oligomer mixture is itself produced from coffee, and a conventional extract typically contains a quantity of mannan oligomers, the resulting coffee extract is not especially different from the conventional coffee extract. For this particular application, it is preferable to have a majority of the mannan oligomers distributed between about DP 1 and DP 6. The mannan oligomer mixture may be added to the conventional coffee extract prior to drying said extract or the mannan oligomer mixture may be dried and then combined with a soluble coffee produced from a conventional extract. Drying may be by any means known in the art, such as freeze drying or spray drying. Alternatively, the mixture can be heavily distributed towards mannose (an "oligomer" of DP 1 as hereinabove defined), which mixture might then be simply converted to mannitol by known methods, providing an inexpensive source of mannitol, a sweetener widely used in the food industry. Other uses of the mannan oligomer mixture having oligomers ranging from DP 1 to DP 10 include adding said mixture to an aqueous coffee extract used in decaffeinating coffee beans so as to infuse the beans with the oligomers, quenching the roasting reaction with the mixture so as to infuse the oligomers in roasted coffee beans and agglomerating spray-dried coffee along with the dried mannan oligomer mixture so as to produce superior agglomerates. Still other uses of the mannan oligomer mixture having oligomers ranging from DP 1 to DP 10 are apparent to a worker skilled in the art and are not limited to the applications described herein.

The following examples illustrate certain embodiments of the present invention. The examples are not meant to limit the invention beyond what is claimed below.

EXAMPLE 1

A series of runs was conducted using essentially the same procedure but varying the acid catalyst, the reaction temperature and the reaction time. The procedure was as follows:

Spent coffee grounds from a commercial percolation process were dispersed in water and milled using a Gifford Wood W-200 Colloid Mill to a particle size well below 0.8 mm (the orifice size of plug flow reactor) to give a slurry of 4.68% by weight solids. The slurry was then placed in the hopper of a plug flow reactor at room temperature and kept agitated to prevent settling. The slurry was then pumped using a Moyno pump into the plug flow reactor having about 113 ml volume. Just prior to feeding the slurry into the reactor, a previously calibrated quantity of 94% by weight sulphuric acid was pumped into the slurry stream with a small variable stroke piston pump to give the desired acid concentration. The reactor consisted of a heating section in which steam was injected directly into the slurry and a reaction section which was essentially a length of tubing. After the slurry entered said reactor, the temperature was rapidly raised by condensation of steam injected into the slurry. The temperature of the reactor was changed by varying the steam pressure by means of a valve and was monitored with a thermocouple. Residence time of the slurry in the reactor could be varied by changing the pumping speed of the Moyno pump. After passing from the reactor through the orifice of the reactor, the slurry dropped back to atmospheric pressure and the temperature correspondingly dropped to about 100° C., quenching the reaction. The slurry and any condensate were further cooled to about room temperature by passing the same through a water cooled heat exchanger. The hydrolyzed slurry was then neutralized with calcium carbonate, and the residue was filtered therefrom.

The resulting hydrolyzate containing the mannan oligomer mixture was analyzed to determine both composition and the distribution of the mannan oligomers between about DP 1 and DP 10. The purity of the mannan oligomer mixtures in this and the following examples were typically in excess of 80%, indicating that essentially only the mannan and very little cellulose was hydrolyzed.

High performance liquid chromatography (H.P.L.C.) was used for the analysis, with the percentage indicated being the relative percentage of the total peak area for the mannan oligomers. The analysis was carried out on a Waters Carbohydrate Analysis column (part number 84038) with a solvent of 70/30 acetonitrile/water. The temperature was maintained at about 17° C. and the solvent flow rate was about 2 ml/min. The peaks were monitored with a Waters differential refractive index detector.

Table 4 shows the results for sulphuric acid. Table 5 shows the results for phosphoric acid and Table 6 shows the results for acetic acid.

TABLE 4

Sulphuric Acid Catalyst

| acid catalyst level % by weight | temp. °C. | time sec. | Distribution of mannan oligomers (%) | | | | | | | | |
|---|---|---|---|---|---|---|---|---|---|---|---|
| | | | DP1 | DP2 | DP3 | DP4 | DP5 | DP6 | DP7 | DP8 | DP9 |
| 0.25 | 200 | 8 | 51.9 | 20.9 | 13.5 | 8.3 | 2.6 | 1.4 | 0.7 | 0.7 | — |
| 0.10 | 220 | 8 | 36.3 | 23.0 | 15.4 | 10.2 | 6.7 | 4.3 | 2.7 | 1.3 | — |
| 0.05 | 220 | 8 | 14.5 | 15.8 | 15.7 | 14.3 | 13.1 | 11.5 | 8.2 | 4.8 | 2.1 |
| 0.025 | 240 | 8 | 12.6 | 14.0 | 14.9 | 14.7 | 14.3 | 12.7 | 8.9 | 4.7 | 3.3 |

TABLE 5

Phosphoric Acid Catalyst

| acid catalyst level % by weight | temp. °C. | time sec. | Distribution of mannan oligomers (%) | | | | | | | | |
|---|---|---|---|---|---|---|---|---|---|---|---|
| | | | DP1 | DP2 | DP3 | DP4 | DP5 | DP6 | DP7 | DP8 | DP9 |
| 0.25 | 240 | 30 | 100 | — | — | — | — | — | — | — | — |
| 0.25 | 220 | 30 | 58.2 | 22.7 | 11.8 | 4.4 | 2.0 | 0.9 | — | — | — |
| 0.25 | 200 | 30 | 25.4 | 21.7 | 17.4 | 13.0 | 9.8 | 6.5 | 4.0 | 2.3 | — |
| 0.25 | 180 | 30 | 22.3 | 20.6 | 15.3 | 12.8 | 13.4 | 10.0 | 5.7 | — | — |
| 1.0 | 200 | 30 | 68.8 | 15.6 | 6.8 | 5.2 | 2.1 | 1.6 | 1.9 | — | — |

TABLE 6

Acetic Acid Catalyst

| acid catalyst level % by weight | temp. °C. | time sec. | Distribution of mannan oligomers (%) | | | | | | | | |
|---|---|---|---|---|---|---|---|---|---|---|---|
| | | | DP1 | DP2 | DP3 | DP4 | DP5 | DP6 | DP7 | DP8 | DP9 |
| 1.0 | 220 | 30 | 14.3 | 15.1 | 15.0 | 15.0 | 14.6 | 12.1 | 8.5 | 5.5 | — |
| 1.0 | 200 | 30 | 12.6 | 13.5 | 11.2 | 12.2 | 13.6 | 15.4 | 9.1 | 12.3 | — |
| 0.25 | 240 | 30 | 14.0 | 15.0 | 15.2 | 14.9 | 13.1 | 12.4 | 9.1 | 6.4 | — |
| 0.25 | 220 | 30 | 14.2 | 12.8 | 13.6 | 14.0 | 13.5 | 13.7 | 11.0 | 2.1 | — |
| 0.25 | 200 | 30 | 23.0 | 13.6 | 11.2 | 12.2 | 13.6 | 15.4 | 9.1 | 12.3 | — |

Examination of the above tables indicates that varying distributions of the mannan oligomers are obtainable by varying the acid catalyst, the reaction temperature and the reaction time. The general trend is for oligomers of lower degree of polymerization for increasing acid concentration, increasing temperature and increasing reaction time.

EXAMPLE 2

Carbon dioxide was fed as a gas into the reactor through the same opening used to pump the sulphuric acid. The carbon dioxide pressure was maintained above that of the steam introduced into the reactor by adjusting the reagulator valve on the carbon dioxide cylinder. The amount of carbon dioxide flowing into the reactor could also be varied by opening the valve on the $CO_2$ regulator. Carbon dioxide levels were estimated to be about 1% by weight resulting in a pH of about 3.4. Different runs were conducted at higher and lower carbon dioxide flow rates. The valve on the $CO_2$ regulator was opened about one-half of the way for the higher carbon dioxide flow rate and only about one-quarter of the way for the lower carbon dioxide flow rate. The effluent coming out of reactor after cooling to room temperature consisted of a loose foam ($CO_2$ gas plus hydrolysate and spent grounds residue). At 240° C., the high and low $CO_2$ flow rates gave comparable oligosaccharide distributions.

The results are shown in Table 7 below

TABLE 7

Carbon Dioxide Catalyst

| $CO_2$ press (atm) | temp. °C. | $CO_2$ flow rate | Distribution of mannan oligomers (%) | | | | | | | | |
|---|---|---|---|---|---|---|---|---|---|---|---|
| | | | DP1 | DP2 | DP3 | DP4 | DP5 | DP6 | DP7 | DP8 | DP9 |
| 41 | 200 | low | 55.8 | 35.7 | | | | Trace | | | |
| 48 | 240 | low | 10.8 | 12.8 | 14.5 | 15.9 | 17.2 | 13.7 | 9.7 | 5.4 | — |
| 48 | 240 | high | 11.7 | 13.6 | 15.4 | 15.8 | 15.1 | 13.7 | 9.0 | 3.0 | 2.8 |

Examination of Table 7 indicates that varying distributions of the mannan oligomers are similarly obtainable with carbon dioxide as the acid catalyst.

EXAMPLE 3

An experiment was run with two modified Wenger ® single screw extruders, produced by Wenger Manufacturing Company of Sabetha, Kans., which were used as high pressure screw conveyors to hydrolyze commercially produced spent coffee grounds of thick consistency (about 60–70% moisture). Spent grounds (approx. 70% moisture) were placed in a live bottom circular bin and fed via two corotating screws into the first extruder (SX-80). This first extruder was used to develop high pressure and preheat the grounds. The output of the SX-80 was then fed into the second extruder (SX-110) and heated further. Sulphuric acid was injected into the front end of the SX-110 at the point where the spent grounds had reached the reaction temperature using a small pump. The temperature remained constant while the slurry was in the reaction zone. The material exited the SX-110 through a hydraulically activated orifice whose opening was controlled by hydraulic pressure. Neither the temperature nor the residence time were accurately measurable. The thermocouples in the extruder appeared to read only the metal barrel temperature. The barrel temperature ranged from 107° C. to about 200° C. Due to surging, the residence time varied. H.P.L.C. analysis again indicated the presence of mannan oligomers.

The results are shown in table 8 below.

TABLE 8

Wenger Extruder

| acid catalyst level % by weight | moisture of spent grounds | barrel temp. (°C.) | Distribution of mannan oligomers (%) | | | | | | |
|---|---|---|---|---|---|---|---|---|---|
| | | | DP1 | DP2 | DP3 | DP4 | DP5 | DP6 | DP7 |
| 1.0 | 70 | 121 | 76.4 | 11.3 | 5.3 | 4.0 | 3.1 | — | — |
| 0.2 | 70 | 121 | 15.3 | 14.9 | 15.6 | 14.9 | 16.7 | 16.1 | 6.5 |
| 0.3 | 60 | 150 | 45.6 | 21.6 | 13.3 | 8.8 | 6.6 | 4.1 | — |

Inasmuch as control was not as precise for the extruder, it was not possible to obtain the range of the mannan oligomers between DP 1 and about DP 10 but it was possible to produce a distribution of mannan oligomers nonetheless.

EXAMPLE 4

An hydrolysate was prepared from spent grounds by hydrolysis in the plug flow reactor at 220° C., with 0.05% sulphuric acid and a residence time of about 7 sec. The hydrolysate was concentrated under vacuum to about 22% by weight solids and mixed with a conventional coffee extract (about 25% solids) at 20% by weight of the extract. The mixture was spray dried in a Niro spray drier at about 160° C. inlet temperature 80° C. outlet temperature. A control consisting of conventionally prepared coffee extract was spray dried under similar conditions, the two samples were rehydrated at the 1% level (1 g/100 cc hot water) and tasted. No major differences were observed in taste of the product. The product containing the hydrolysate was slightly more turbid due to some suspended solids and was in that respect more like home brewed coffee.

What is claimed is:

1. A method of hydrolyzing a coffee extraction residue material to produce mannan oligomers from DP 1 to about DP 10 said coffee extraction residue material comprising coffee grounds that have been atmospherically extracted and then thermally hydrolyzed to remove most of the arabinogalactan therefrom, said method comprising:
   (a) slurrying the coffee extraction residue material in a liquid to between 5% and 60% by weight dry basis, residue material;
   (b) adding an acid catalyst to the slurry in an amount sufficient to adjust the pH of said slurry to between pH 0.5 and pH 4;
   (c) feeding the slurry through a reactor at a temperature between 160° C. and 260° C. in from 6 seconds to 60 seconds at a pressure between 6 atmospheres and 35 atmospheres to hydrolyze the mannan;
   (d) discharging the slurry from the reactor through an orifice so that the pressure is rapidly reduced to atmospheric, quenching the hydrolysis reaction;
   (e) neutralizing the discharged slurry; and
   (f) separating hydrolyzed coffee extraction residue material from the mannan oligomers from DP 1 to about DP 10 to produce mannan oligomers of a purity in excess of 80%.

2. A method as in claim 1 wherein the slurry is between about 5% and 20% by weight dry basis, residue material and the reactor of 1(c) is a plug flow tubular reactor.

3. A method as in claim 2 wherein the mannan oligomers from DP 1 to about DP 10 are separated from the hydrolyzed coffee extraction residue material as an aqueous solution.

4. A method as in claim 3 wherein the acid catalyst is selected from the group consisting of sulphuric acid, phosphuric acid, nitric acid, hydrochloric acid, acetic acid, citric acid, tartaric acid, malic acid, adipic acid, fumaric acid and combinations thereof.

5. A method as in claim 4 wherein the temperature in the plug flow tubular reactor is from 190° C. to 220° C.

6. A method as in claim 1 wherein the reactor of 1(c) is an extruder.

7. A method as in claim 1 wherein sulphuric acid is added to the slurry at between 0.05% and 0.5% by weight of said slurry as the acid catalyst.

8. A method of hydrolyzing a coffee extraction residue material to produce mannan oligomers from DP 1 to about DP 10 said coffee extraction residue material comprising coffee grounds that have been atmospherically extracted and then thermally hydrolyzed to remove most of the arabinogalactan therefrom, said method comprising:
   (a) slurrying the coffee extraction residue material in a liquid to between 5% and 60% by weight dry basis, residue material;
   (b) reacting the slurry in a reactor at a temperature between 160° C. and 260° C. for from 6 seconds to 60 seconds while simultaneously injecting carbon dioxide into the reactor as an acid catalyst so that the pH is less than about pH 4;
   (d) discharging the slurry from the reactor through an orifice so that the pressure is rapidly reduced to atmospheric, rapidly quenching the hydrolysis reaction; and
   (e) separating hydrolyzed coffee extraction residue material from the mannan oligomer solution having oligomers from DP 1 to about DP 10 to produce mannan oligomers of a purity in excess of 80%.

9. A method as in claim 8 wherein the slurry is between 5% and 20% by weight dry basis, residue material and the reactor of 9(b) is a plug flow tubular reactor.

10. A method as in claim 8 wherein the reactor of 9(b) is an extruder.

11. A method as in claim 1 or 9 wherein the liquid from which the slurry is made is water.

12. A method as in claim 3 or 9 which further comprises drying the mannan oligomer solution having oligomers from DP 1 to DP 10.

13. A method as in claim 12 which further comprises combining the dried mannan oligomer solution with a soluble coffee.

14. A method as in claim 3 or 9 which further comprises combining the mannan oligomer solution having oligomers from DP 1 to DP 10 with a conventional coffee extract and drying said combination.

* * * * *